US009706611B2

(12) United States Patent
Walters et al.

(10) Patent No.: US 9,706,611 B2
(45) Date of Patent: Jul. 11, 2017

(54) SOLID STATE LIGHTING APPARATUSES, CIRCUITS, METHODS, AND COMPUTER PROGRAM PRODUCTS PROVIDING TARGETED SPECTRAL POWER DISTRIBUTION OUTPUT USING PULSE WIDTH MODULATION CONTROL

(71) Applicant: CREE, INC., Durham, NC (US)

(72) Inventors: Mike Walters, Apex, NC (US); Jason Taylor, Cary, NC (US); Daniel Pope, Morrisville, NC (US)

(73) Assignee: Cree, Inc., Durham, NC (US)

( * ) Notice: Subject to any disclaimer, the term of this patent is extended or adjusted under 35 U.S.C. 154(b) by 44 days.

(21) Appl. No.: 14/813,308

(22) Filed: Jul. 30, 2015

(65) Prior Publication Data

US 2015/0351190 A1    Dec. 3, 2015

Related U.S. Application Data

(63) Continuation-in-part of application No. 14/292,286, filed on May 30, 2014.

(51) Int. Cl.
H05B 33/08       (2006.01)

(52) U.S. Cl.
CPC ..... *H05B 33/0812* (2013.01); *H05B 33/0815* (2013.01); *H05B 33/0872* (2013.01); *Y02B 20/345* (2013.01)

(58) Field of Classification Search
CPC ..... G09G 2320/0666; G09G 2360/145; G09G 2320/064; G09G 3/3413; G09G 2320/041; H05B 33/0869; H05B 33/0857; H05B 33/0815; H05B 33/083; H05B 33/086; H05B 33/0872; H05B 33/0866
See application file for complete search history.

(56) References Cited

U.S. PATENT DOCUMENTS

| 7,038,399 | B2 | 5/2006 | Lys et al. |
|---|---|---|---|
| 8,890,420 | B2 | 11/2014 | Bradford |
| 8,901,829 | B2 | 12/2014 | van de Ven et al. |
| 9,131,561 | B2 | 9/2015 | Athalye |
| 9,277,605 | B2 | 3/2016 | Ni |
| 2004/0135524 | A1* | 7/2004 | Gunter ............... H05B 33/0803 315/291 |
| 2007/0115228 | A1 | 5/2007 | Roberts et al. |
| 2007/0115662 | A1 | 5/2007 | Roberts et al. |

(Continued)

OTHER PUBLICATIONS

Rea et al., Color Rendering: A Tale of Two Metrics, Col Res Appl, 33:192-202, (2008).

(Continued)

*Primary Examiner* — Jany Richardson
(74) *Attorney, Agent, or Firm* — Myers Bigel, P.A.

(57) ABSTRACT

A solid state lighting apparatus can include a variable color input signal configured to indicate a target color of light output from the apparatus. A string current Pulse Width Modulation (PWM) controller circuit can be coupled to the variable color input signal, where the string current PWM controller circuit can be configured to generate a plurality of PWM signals having respective variable duty cycles to enable/disable respective particular string currents for respective variable times as the variable color input signal changes.

21 Claims, 9 Drawing Sheets

(56) References Cited

U.S. PATENT DOCUMENTS

| | | |
|---|---|---|
| 2009/0020684 A1* | 1/2009 | Shih .................... G01J 1/32 |
| | | 250/205 |
| 2009/0160363 A1 | 6/2009 | Negley et al. |
| 2010/0007292 A1* | 1/2010 | Horino .............. H05B 37/029 |
| | | 315/312 |
| 2011/0068701 A1 | 3/2011 | van de Ven et al. |
| 2011/0068702 A1 | 3/2011 | van de Ven et al. |
| 2013/0271031 A1* | 10/2013 | Chen .................... H05B 37/02 |
| | | 315/297 |
| 2015/0351187 A1 | 12/2015 | McBryde et al. |

OTHER PUBLICATIONS

Pousset et al., "Visual Experiment on LED Lighting Quality with Color Quality Scale Colored Samples", CIE 2010: Lighting Quality and Energy Efficiency, Mar. 14-17, 2010.

Lutron, Diva 0-10V Control, Specification, Aug. 12, 2009, Retrieved from the internet at URL http://www.lutron.com/TechnicalDocumentLibrary/Diva_0-10Vsubmittal.pdf.

\* cited by examiner

SOLID STATE LIGHTING APPARATUSES, CIRCUITS, METHODS, AND COMPUTER PROGRAM PRODUCTS PROVIDING TARGETED SPECTRAL POWER DISTRIBUTION OUTPUT USING PULSE WIDTH MODULATION CONTROL

CROSS-REFERENCE TO RELATED APPLICATION

This application is a Continuation-in-Part of U.S. patent application Ser. No. 14/292,286, filed May 30, 2014, the entire disclosure of which is hereby incorporated herein by reference.

FIELD

The invention relates to the field of lighting in general, and more particularly, to solid state lighting.

BACKGROUND

Solid state lighting arrays are used for a number of lighting applications. For example, solid state lighting panels including arrays of solid state light emitting devices have been used as direct illumination sources, for example, in architectural and/or accent lighting.

A solid state light emitting device may include, for example, a packaged light emitting device including one or more light emitting diodes, which may include inorganic light emitting diodes, which may include semiconductor layers forming p-n junctions and/or organic light emitting diodes, which may include organic light emission layers. Visible light may include light having many different wavelengths. The apparent color of visible light can be illustrated with reference to a two dimensional chromaticity diagram, such as the 1931 International Conference on Illumination (CIE) Chromaticity Diagram illustrated in FIG. 1, which can provide a useful reference for defining colors as weighted sums of colors.

As shown in FIG. 1, colors on a 1931 CIE Chromaticity Diagram are defined by x and y coordinates (i.e., chromaticity coordinates, or color points) that fall within a generally U-shaped area. Colors on or near the outside of the area are saturated colors composed of light having a single wavelength, or a very small wavelength distribution. Colors on the interior of the area are unsaturated colors that are composed of a mixture of different wavelengths. White light, which can be a mixture of many different wavelengths, is generally found near the middle of the diagram, in the region labeled 100 in FIG. 1. There are many different hues of light that may be considered "white," as evidenced by the size of the region 100. For example, some "white" light, such as light generated by sodium vapor lighting devices, may appear yellowish in color, while other "white" light, such as light generated by some fluorescent lighting devices, may appear more bluish in color.

Light that generally appears green is plotted in the regions 101, 102 and 103 that are above the white region 100, while light below the white region 100 generally appears pink, purple or magenta. For example, light plotted in regions 104 and 111 of FIG. 1 generally appears magenta (i.e., red-purple or purplish red).

It is further known that a binary combination of light from two different light sources may appear to have a different color than either of the two constituent colors. The color of the combined light may depend on the relative intensities of the two light sources. For example, light emitted by a combination of a blue source and a red/orange source may appear purple or magenta to an observer. Similarly, light emitted by a combination of a blue source and a yellow source may appear white to an observer.

Also illustrated in FIG. 1 is the Planckian locus 106, which corresponds to the location of color points of light emitted by a black-body radiator that is heated to various temperatures. In particular, FIG. 1 includes temperature listings along the Planckian locus. These temperature listings show the color path of light emitted by a black-body radiator that is heated to such temperatures. As a heated object becomes incandescent, it first glows reddish, then yellowish, then white, and finally bluish, as the wavelength associated with the peak radiation of the black-body radiator becomes progressively shorter with increased temperature.

The chromaticity of a particular light source may be referred to as the "color point" of the source. For a white light source, the chromaticity may be referred to as the "white point" of the source. The white point of a white light source may fall along the Planckian locus. Accordingly, a white point may be identified by a correlated color temperature (CCT) of the light source. White light typically has a CCT of between about 2000 K and 10000 K. White light with a CCT of 3000 may appear yellowish in color, while light with a CCT of 8000 K may appear more bluish in color. Color coordinates that lie on or near the Planckian locus at a color temperature between about 2500 K and 8000 K may yield pleasing white light to a human observer.

"White" light also includes light that is near, but not directly on the Planckian locus. A Macadam ellipse can be used on a 1931 CIE Chromaticity Diagram to identify color points that are so closely related that they appear the same, or substantially similar, to a human observer. A Macadam ellipse is a closed region around a center point in a two-dimensional chromaticity space, such as the 1931 CIE Chromaticity Diagram, that encompasses all points that are visually indistinguishable from the center point. A seven-step Macadam ellipse captures points that are indistinguishable to an ordinary observer within seven standard deviations, a ten step Macadam ellipse captures points that are indistinguishable to an ordinary observer within ten standard deviations, and so on. Accordingly, light having a color point that is within about a ten step Macadam ellipse of a point on the Planckian locus may be considered to have a substantially similar color as the point on the Planckian locus.

The ability of a light source to accurately reproduce color in illuminated objects is typically characterized using the color rendering index (CRI). In particular, CRI is a relative measurement of how the color rendering properties of an illumination system compare to those of a reference illuminator, with a reference illuminator for a CCT of less than 5000K being a black-body radiator. For CCT of 5000K and above, the reference illuminator is a spectrum defined by the CIE which is similar to the spectrum of sunlight at the earth's surface. The CRI equals 100 if the color coordinates of a set of test colors being illuminated by the illumination system are the same as the coordinates of the same test colors being irradiated by the reference illuminator. Daylight has the highest CRI (of 100), with incandescent bulbs being relatively close (about 95), and fluorescent lighting being less accurate (70-85).

Generally speaking, incandescent bulbs tend to produce more natural-appearing illumination than other types of conventional lighting devices. In particular, incandescent bulbs typically go from a color temperature of about 2700K at full brightness to a color temperature of about 2000 k at 5% brightness and to a color temperature of about 1800K at about 1% brightness. This compares favorably with daylight, which varies from about 6500K at midday to about 2500 k at sunrise and sunset. Research indicates that people tend to prefer warmer color temperatures at low brightness levels and in intimate settings.

In illumination applications, it is often desirable to provide a lighting source that generates a light with a color behavior that approximates the behavior of incandescent lighting. Light emitting diode based lighting fixtures have been proposed that may be coupled to an ac dimmer circuit (such as a rheostat or phase cut dimming circuit) and approximate the lighting variation of a conventional incandescent light as the dimmer circuit increases or decreases the brightness of the generated light, as described in U.S. Pat. No. 7,038,399 to Lys et al.

One difficulty with solid state lighting fixtures including multiple solid state devices, is that the manufacturing process can result in variations between individual light emitting diodes. This variation is typically accounted for by binning, or grouping, the light emitting diodes based on brightness, and/or color point, and selecting only light emitting diodes having predetermined characteristics for inclusion in a solid state lighting system. LED lighting devices may utilize one bin of light emitting diodes, or combine matched sets of light emitting diodes from different bins, to achieve repeatable color points for the combined output of the light emitting diodes.

One technique to tune the color point of a lighting fixture is described in commonly assigned United States Patent Publication No. 2009/0160363, the disclosure of which is incorporated herein by reference. The '363 application describes a system in which phosphor converted light emitting diodes and red/orange light emitting diodes are combined to provide white light. The ratio of the various mixed colors of the light emitting diodes is set at the time of manufacture by measuring the output of the light and then adjusting string currents to reach a desired color point. The current levels that achieve the desired color point are then fixed for the particular lighting device. LED lighting systems employing feedback to obtain a desired color point are described in U.S. Publication Nos. 2007/0115662 and 2007/0115228 and the disclosures of which are incorporated herein by reference.

SUMMARY

A solid state lighting apparatus can include a variable color input signal configured to indicate a target color of light output from the apparatus. A string current Pulse Width Modulation (PWM) controller circuit can be coupled to the variable color input signal, where the string current PWM controller circuit can be configured to generate a plurality of PWM signals having respective variable duty cycles to enable/disable respective particular string currents for respective variable times as the variable color input signal changes.

In some embodiments, a solid state lighting apparatus can include a plurality of solid state Light Emitting Device (LED) strings, each of the LED strings configured to conduct a respective one of a plurality of particular string currents. A variable color input signal can be configured to indicate a target color of light output from the apparatus and a variable brightness input signal can be configured to indicate a target brightness level of the light output from the apparatus. A string current Pulse Width Modulation (PWM) controller circuit can include a color/brightness combiner circuit that can be configured to multiply a level of the variable color input signal with a level of the variable brightness input signal to provide a combined color/brightness input signal and a plurality of PWM circuits can be configured to generate a plurality of PWM signals at respective variable duty cycles to enable/disable the respective particular string current for a respective variable time based on a level of the combined color/brightness input signal. A plurality of string current switching circuits can each be configured to receive a respective one of the plurality of PWM signals and can be configured to enable/disable the respective particular string current to flow through a respective one of the LED strings using the respective variable duty cycle.

In some embodiments, a solid state lighting apparatus can include a plurality of solid state Light Emitting Device (LED) strings, each of the LED strings configured to conduct a respective one of a plurality of particular string currents. A first variable spectral power distribution input signal can be configured to indicate a first target spectral characteristic of light output from the apparatus. A second variable spectral power distribution input signal can be configured to indicate a second target spectral characteristic of the light output from the apparatus and a string current Pulse Width Modulation (PWM) controller circuit can be coupled to the first and second variable spectral power distribution input signals, where the string current PWM controller circuit can be configured to combine respective levels of the first and second variable spectral power distribution input signals to provide a combined variable spectral power distribution input signal, and can be configured to generate a plurality of PWM signals having respective variable duty cycles to enable/disable respective particular string currents for respective variable times as a level of the combined variable spectral power distribution input signal changes.

In some embodiments, a method of operating a solid state lighting apparatus can be provided by receiving a variable color input signal at the solid state lighting apparatus, where the variable color input signal can be configured to indicate a target color of light output from the apparatus and generating a plurality of PWM signals using a string current Pulse Width Modulation (PWM) controller circuit that can be coupled to the variable color input signal, the plurality of PWM signals having respective variable duty cycles to enable/disable respective particular string currents for respective variable times as the variable color input signal changes.

DETAILED DESCRIPTION OF EMBODIMENTS ACCORDING TO THE INVENTION

Figure 1:
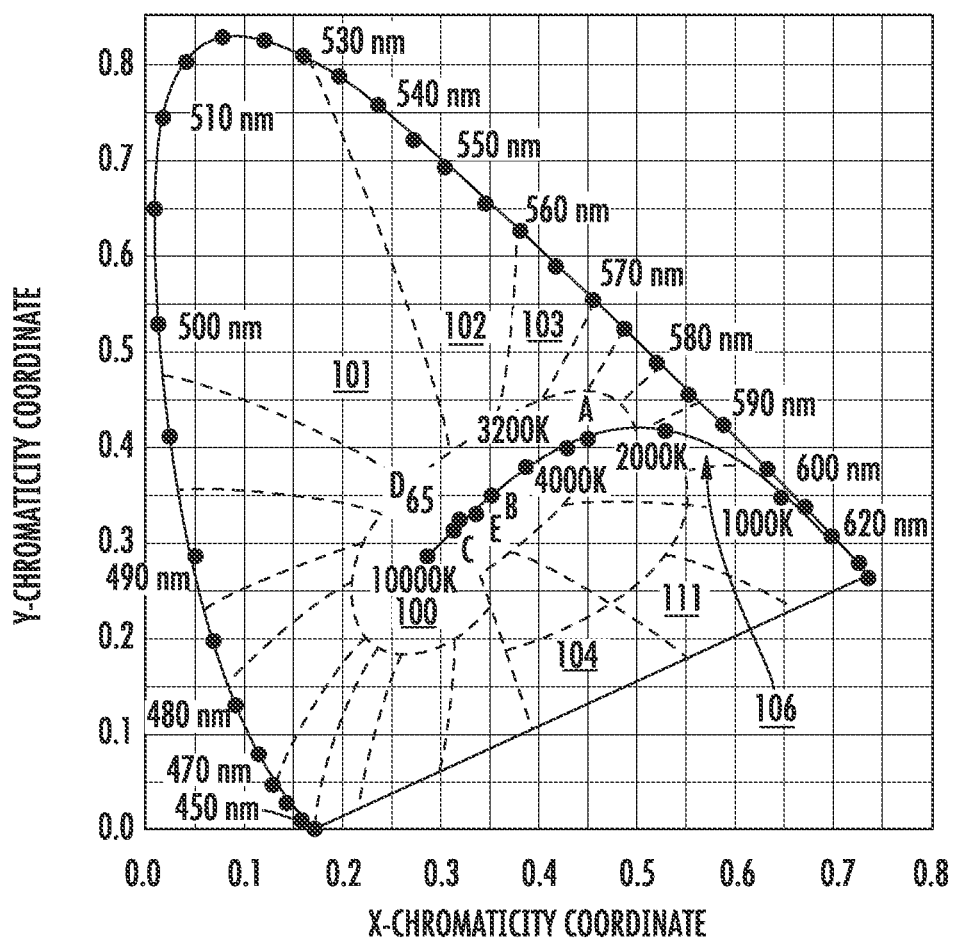
FIG. 1 is a chromaticity diagram illustrating a Planckian locus using x and y chromaticity coordinates

Embodiments of the present inventive subject matter are described hereinafter with reference to the accompanying drawings, in which embodiments of the present inventive subject matter are shown. This present inventive subject matter may, however, be embodied in many different forms and should not be construed as limited to the embodiments set forth herein. Rather, these embodiments are provided so that this disclosure will be thorough and complete, and will fully convey the scope of the present inventive subject matter to those skilled in the art. Like numbers refer to like elements throughout.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing ac incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The following description of some embodiments of the inventive subject matter refers to "light emitting devices" (LEDs), which may include, but is not limited to, solid-state lighting devices, such as light emitting diode devices. As used herein, "LED" includes, but is not limited to, direct-emission devices that produce light when a voltage is applied across a PN junction thereof, as well as combinations of such direct-emission devices with luminescent materials, such as phosphors that emit visible-light radiation when excited by a source of radiation, such as a direct-emission device.

In some embodiments, the present invention can be utilized in connection with bypass circuits, using the current sensed in the LED string and the temperature associated therewith, as described in co-pending and commonly assigned U.S. patent application Ser. No. 12/566,195 entitled "Solid State Lighting Apparatus with Controllable Bypass Circuits and Methods of Operating Thereof", co-pending and commonly assigned U.S. patent application Ser. No. 12/704,730 entitled "Solid State Lighting Apparatus with Compensation Bypass Circuits and Methods of Operation Thereof" and co-pending and commonly assigned U.S. patent application Ser. No. 12/566,142 entitled "Solid State Lighting Apparatus with Configurable Shunts", the disclosures of which are incorporated herein by reference. Temperature compensation is described in co-pending and commonly assigned U.S. patent application Ser. No. 13/565,166, (P1513), entitled "Temperature Curve Compensation Offset" the disclosure of which is incorporated herein by reference.

Figure 2A:
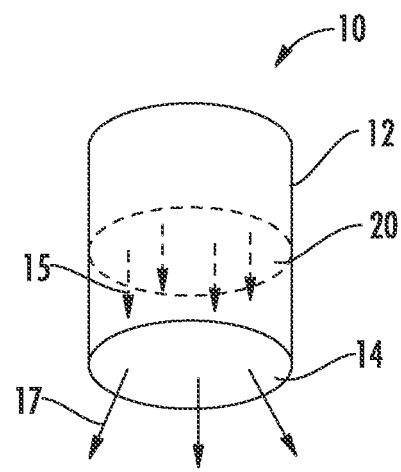
FIGS. 2A and 2B illustrate a solid state lighting apparatus in some embodiments according to the invention.
Figure 2B:
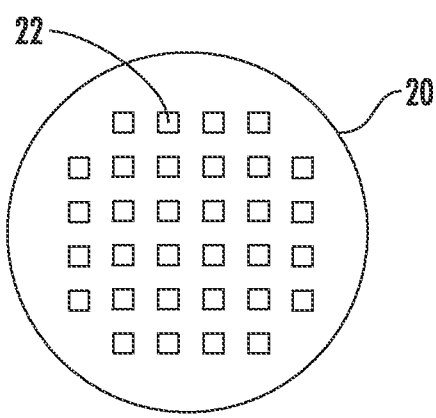

Referring to FIGS. 2A and 2B, a lighting apparatus 10 according to some embodiments is illustrated. The lighting apparatus 10 shown in FIGS. 2A and 2B is a "recessed downlight" or "can" lighting fixture that may be suitable for use in general illumination applications as a down light or spot light. However, it will be appreciated that a lighting apparatus according to some embodiments may have a different form factor. For example, a lighting apparatus according to some embodiments can have the shape of a conventional light bulb, a pan or tray light, an automotive headlamp, or any other suitable form.

The lighting apparatus 10 generally includes a can shaped outer housing 12 in which a lighting panel 20 is arranged. In the embodiments illustrated in FIGS. 2A and 2B, the lighting panel 20 has a generally circular shape so as to fit within an interior of the cylindrical housing 12. Light is generated by solid state lighting devices (LEDs) 22, which are mounted on the lighting panel 20, and which are arranged to emit light 15 towards a diffusing lens 14 mounted at the end of the housing 12. Diffused light 17 is emitted through the lens 14. In some embodiments, the lens 14 may not diffuse the emitted light 15, but may redirect and/or focus the emitted light 15 in a desired near-field or far-field pattern. The LEDs 22 may include LEDs of different chromaticities grouped into separately controlled strings that may be selectively controlled to produce a desired spectral power distribution, brightness, and/or correlated color temperature (CCT) using various techniques discussed herein.

It will be understood that the term LED "string" refers to a configuration of LEDs that allows a respective particular current (such as a full-on current) to be enabled/disabled through that particular configuration (such as by manipulation of a brightness level input, a color value input, and/or spectral power distribution input) separately from enabling/disabling other respective particular currents through other LED strings in the apparatus. A string can include at least one LED device, which can itself include a number of serially connected epi junctions used to provide a device that has a particular forward voltage, such as 3V, 6V, 9V, etc. where a single epi junction may have a forward voltage of about 1.5 volts. Each string may include multiple LEDs that are connected in various parallel and/or serial arrangements such that each string may be provided with the respective full-on current for that string separately from the provisioning of the other LED strings. The strings of LEDs may be configured in a number of different ways and may have various compensation circuits associated therewith, as discussed, for example, in commonly assigned co-pending U.S. application Ser. No. 13/235,103 and U.S. application Ser. No. 13/235,127.

An LED can be characterized as having a particular spectral power distribution, which can affect various light characteristics of the light emitted by the LED. It will be understood that a spectral power distribution can be used to express the power per unit area per unit wavelength of an illumination (radiant exitance), or more generally, the per wavelength contribution to any radiometric quantity (such as radiant energy, radiant flux, radiant intensity, radiance, irradiance, radiant exitance, and/or radiosity, etc.). It will be further understood that a spectral power distribution may be normalized in some manner, such as, to unity at 555 or 560 nanometers, coinciding with the peak of the eye's luminosity function, in addition to the light characteristics described herein, such as CRI, CCT, CX and CY, etc.

The spectral power distribution of the combinations of LED strings can create an overall spectral power distribution for the lighting apparatus which can change based on which of the LED strings are on and for how long each of the LED strings is on. This timing associated with the LED strings having associated spectral power distributions can affect the lighting characteristics of the lighting apparatus including the CCT, the Color Quality Scale (CQS), the dominant wavelength, the GAI, peak wavelength, the S/P ratio, the nonlinear brightness, the luminous efficacy, and the like. Other lighting characteristics can also be included within the definition of the spectral power distribution.

It will be understood that Color Quality Scale (CQS) is a quantitative measure of the ability of a light source to reproduce colors of illuminated objects, which was developed by The National Institute of Standards and Technology (NIST). The characteristic of "dominant wavelength" (and complementary wavelength) is a way of describing non-spectral (polychromatic) light mixtures in terms of the spectral (monochromatic) light that evokes an identical perception of hue. For example, in FIG. 1, a straight line drawn between the point for a given color and the point for the color of the illuminant can be extrapolated so that it intersects the perimeter of the space in two points. The point of intersection nearer to the color in question can indicate the dominant wavelength of the color as the wavelength of the spectral color at that intersection point. The point of intersection on the opposite side of the color space gives the complementary wavelength, which when added to the color in question in the right proportion will yield the color of the illuminant. CQS is further described in, for example, VISUAL EXPERIMENT ON LED LIGHTING QUALITY WITH COLOR QUALITY SCALE COLORED SAMPLES, Nicolas Pousset, CIE 2010 Lighting Quality and Energy Efficiency, 14-17 Mar. 2010, which is incorporated herein by reference.

Gamut Area Index (GAI) refers to the subset of colors which can be accurately represented in a given circumstance, such as within a given color space or by a certain output device. GAI is further described in, for example, Color Rendering: A Tale of Two Metrics by Mark S. Rea et al., 2008 Wiley Periodicals, Inc. Col Res Appl, 33, 192-202, 2008; Published online in Wiley InterScience (www.interscience.wiley.com). DOI 10.1002/col.20399, which is incorporated herein by reference.

The ratio of scotopic luminance (or lumens) versus photopic luminance in a light source (S/P ratio) is a multiplier that can be used to determine the apparent visual brightness of a light source as well as how much light, that is useful to the human eye, a source emits. The luminous efficacy of a source is a measure of the efficiency with which the source provides visible light from electricity. Luminous efficacy is a measure of the proportion of the energy supplied to a lamp that is converted into light energy. It can be calculated by dividing the lamp's luminous flux, measured in lumens, by the power consumption, measured in watts.

It will be understood that the term "targeted" can include configurations of the LED strings that are configured to provide a pre-defined lighting characteristic that is a specified parameter for the lighting apparatus. For example, a targeted spectral power distribution can be a spectral power distribution that is specified for the light provided by the apparatus as a result of manipulating inputs to the apparatus, such as brightness and/or a color inputs. In particular, the targeted spectral power distribution can describe an additional characteristic of the light (such as CRI) that is generated separately from a particular brightness level and a particular CCT. In some embodiments according to the invention, the targeted aspect can be specified on the packaging of the lighting apparatus or otherwise in conjunction with the advertising or marketing of the lighting apparatus.

As described herein, some solid state lighting fixtures provide the capability to adjust the color of light emitted by the fixture. Color adjustment can be provided by varying the amount of light generated by separate LED strings included in the fixture. For example, in some approaches, the variable color output can be provided by adjusting the amount of lumens generated by different colored LED strings by changing the current that flows through the different strings. The color of the light can therefore be provided by the ratio of lumens generated by the different LED strings as a result of the different currents which flow through those LED strings.

As appreciated by the present inventors, however, the lumens emitted from a particular LED string does not necessarily scale linearly with changes in current. In other words, the relationship between the current which passes through the LED string and the amount of light generated by the LED string is nonlinear. Accordingly, it can be difficult to control, for example, the color of the light generated by the apparatus when the currents supplied to the LED strings change. Moreover, this relationship can be further complicated by changes in the color output from the LED strings as the temperature of the LEDs change.

Accordingly, as appreciated by the present inventors, a particular current can be specified for each of the LED strings included in the fixture. The particular current for a particular LED string may be the current used to generate the maximum light output (i.e., lumens) for any color correlated temperature (CCT) that the fixture is specified to emit. For example, if a light fixture is specified to emit light over a particular range of CCT values, the maximum current required to generate any of those CCT values can be specified for each of the LED strings.

In some embodiments according to the invention, the color output from the fixture can be adjusted by enabling/disabling the particular current through each of the respective LED strings using a pulse width modulated (PWM) signal. In other words, rather than continuously changing the instantaneous current through each of the different LED strings, in some embodiments according to the invention, the particular current for each of the particular LED strings is switched on/off through the respective LED string using a PWM signal. Accordingly, the amount of "on time" indicated by the PWM signal for a particular string provides the amount of light generated by the particular current but only for the "on time."

As appreciated by the present inventors, the color of light output from the fixture may be more readily controlled by modifying the duty cycle of the PWM signal rather than by changing the instantaneous current which flows through the LED string as the variable color input signal changes. For example, if a particular CCT value calls for a particular ratio of lumens from the different LED strings, the lumen contribution called for from each of the LED strings can be provided by using the duty cycles of the PWM signals to switch each of the particular string currents on/off in each string. When, however, the color of the light output is to be changed, the duty cycles of the PWM signals can be changed to change the lumen contributions of the strings by allowing the particular currents to flow for more or less time. Accordingly, the control of the LED strings can be simplified despite the requirement that the solid state light fixture generate a wide range of CCT values for the emitted light.

It will be understood that while many of the embodiments described herein refer to a "full-on" current, embodiments according to the present invention include the use of a "particular" current that may be a value of current that is selected for the PWM control without being the "full-on" current. Accordingly, in some embodiments, the particular current can be the full-on current. As further appreciated by the present inventors, the brightness level of the light emitted by the fixture can also be expressed as a PWM signal which can be combined with the PWM signals configured for control of the color.

Although many of the embodiments described herein reference the use of a variable color input signal and a variable brightness input signal, any variable input signals can be used to specify characteristics of the light emitted by the fixture. Accordingly, inputs to the string current PWM controller circuit can be any signal that specifies a targeted value of a spectral power distribution for the light emitted by the fixture, which can include color, brightness, and other lighting characteristics such as CRI, vividness, etc. Accordingly, in such embodiments, the duty cycle of PWM signals can be changed to enable/disable the full-on string current through the LED strings to affect the spectral power distribution of the light emitted by the fixture.

As described herein below in further detail, a variable color input signal can be used to specify a duty cycle for a PWM circuit which, in turn, generates PWM signals for string current switching circuits which enable/disable respective full-on string currents through the different LED strings. In still other embodiments according to the invention, a variable brightness input signal can be combined with the variable color input signal to generate the duty cycle signal used by the PWM circuit.

In still further embodiments according to the invention, the duty cycle signal generated by the variable color input signal or the combination of the variable color input signal with the variable brightness input signal can be combined with an indication of the full-on string current to provide a signal that indicates the average current to be used by a particular string over the cycle of operation for that LED string. An indication of the average current can also be provided to the respective string current switching circuit for use with the respective PWM signal for a particular LED string.

In still further embodiments according to the invention, separate PWM circuits can be used to generate a respective PWM signal for both the color and the brightness input signals to provide a combined PWM signal for the respective string current switching circuit used to enable/disable the full-on string current to the respective LED string. The respective levels of the color input signal and the brightness input signal can also be combined with the full-on string current to generate an indication of the average current which can also be provided to the string current switching circuit for enabling/disabling of the full-on string current through the LED string.

It will be understood that in some embodiments, the color/brightness/spectral power distribution input may be provided via manual input (by, for example, a user manipulating a switch or other control). In some embodiments, the color input may be provided by a camera, an ambient light sensor that can determine spectral data. Other devices may also be used.

Figure 3:
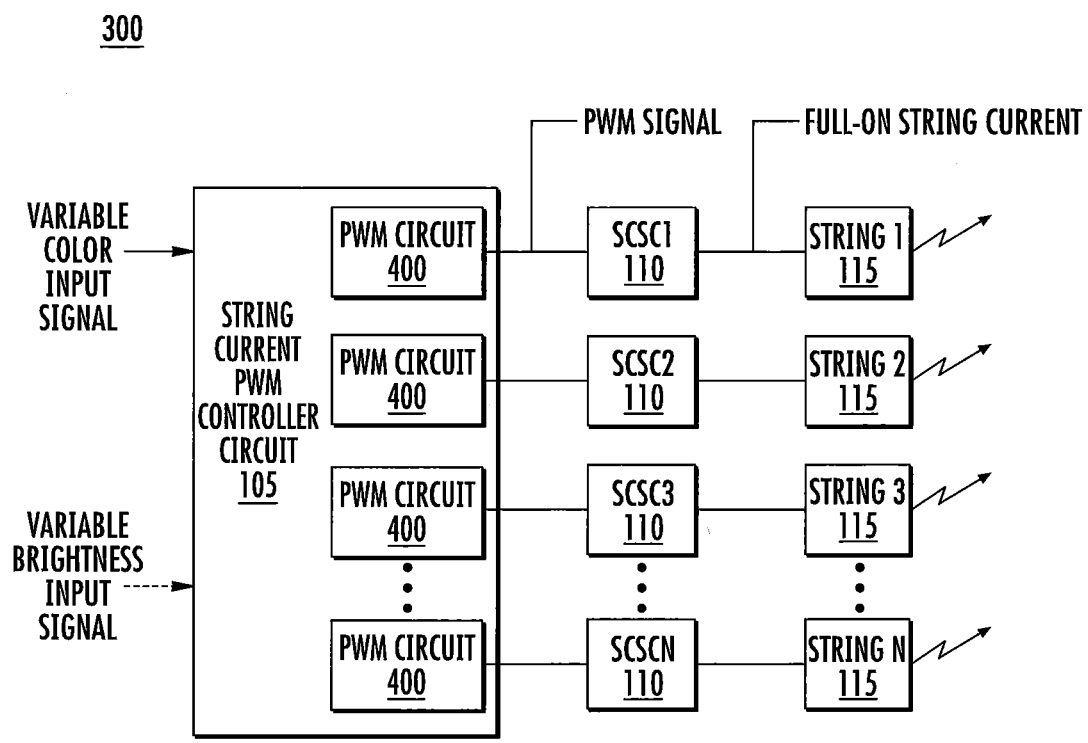
FIG. 3 is a block diagram illustrating a solid state lighting apparatus including a string current PWM controller circuit configured to enable full-on string current switching through a plurality of LED strings responsive to a variable color input signal and, optionally, a variable brightness input signal in some embodiments according to the invention.

FIG. 3 is a block diagram that illustrates a solid state lighting apparatus 300 including a string current pulse width modulation (PWM) controller circuit 105 configured to enable/disable full-on string currents to each of a respective LED strings 115 in some embodiments according to the invention. According to FIG. 3, a variable color input signal can be provided to the string current PWM controller circuit 105. The variable color input signal can be any indication of a target color light that is to be emitted by the solid state lighting fixture 300. For example, in some embodiments according to the invention, the variable color input signal can provide a signal level that corresponds to a target color light that is to be emitted by the fixture 300. In some embodiments according to the invention, the variable color input signal may take other forms, such as a digital expression of the color to be targeted by the light emitted by the fixture 300.

Furthermore, the variable color input signal can indicate a range of colors to be targeted by the fixture 300. For example, the variable color input signal may specify a relatively warm CCT value at one extreme and a relatively cool color at the opposite extreme. In some embodiments according to the invention, the range of CCT values may vary from 1K to 10,000K. Still further, the discrete CCT values represented by the variable color input signal may be relatively fine or coarse. In other words, the range of values corresponding to the variable color input signal level may range from a few CCT values to dozens of CCT values.

The string current PWM controller circuit 105 is configured to generate a plurality of PWM signals based on the level of the variable color input signal. For example, as the level of the variable color input signal changes, each of the PWM signals generated by the string current PWM controller circuit 105 may change so that the fixture 300 targets the color specified by the variable color input signal.

It will be understood that the string current PWM controller circuit can include a microcontroller, microprocessor, or other general purpose or specialized processor circuit that includes the appurtenant circuitry for the provisioning of functions such as those described herein. The term "controller circuit" includes, but is not limited to, a hardware element operatively coupled with a firmware component and/or software component.

As further shown in FIG. 3, the PWM signals are connected to respective string current switching circuits 110 each of which controls a respective full-on string current. The string current switching circuits 110 can be any circuit that is configured to switch the full-on string current on/off in accordance with the timing of the respective PWM signal provided by the controller circuit 105. Each of the full-on string current signals is provided to a respective LED string 115. In operation, the string current switching circuits 110 enable/disable the full-on string current through the respective LED string 115 connected thereto in accordance with the duty cycle of the PWM signal.

It will be understood that each of the full-on string currents associated with the LED strings 115 can be different. In other words, in the arrangement shown in FIG. 3, each of the full-on string currents associated with an LED string 115 can be different depending on the contribution from that particular string that may be needed to produce the target color output by the fixture 300. For example, if string 1 is a blue shifted yellow LED string, the maximum current needed to generate any of the CCT values supported by the fixture 300 may be less than the full-on string current needed for string 2 to support the same CCT value, but may be less than the full-on string current needed for string 3 to support the CCT value. Moreover, in some embodiments according to the invention, as the level of the variable color input signal changes, the full-on string currents for each of the LED strings are not changed, however, the duty cycles of the PWM signals associated with the LED strings can change so that the lumen contributions from the LED strings change to generate the new targeted color value.

Still referring to FIG. 3, the light fixture 300 may also be provided with a variable brightness input signal to specify the targeted brightness level for the light emitted by the fixture 300. Accordingly, the string current PWM controller circuit 105 can combine the variable color input signal with the variable brightness input signal to generate the PWM signals which switch the full-on string currents.

It will be understood that the brightness can be provided by any circuit configured to communicate a level of brightness targeted for the lighting apparatus. In some embodiments according to the invention, the brightness circuit can also provide dimming control using a digital interface, such as those described on the Internet at lutron.com/TechnicalDocumentLibrary/Diva_0_10Vsubmittal.pdf, the entirety of which is hereby incorporated by reference.

Figure 4:
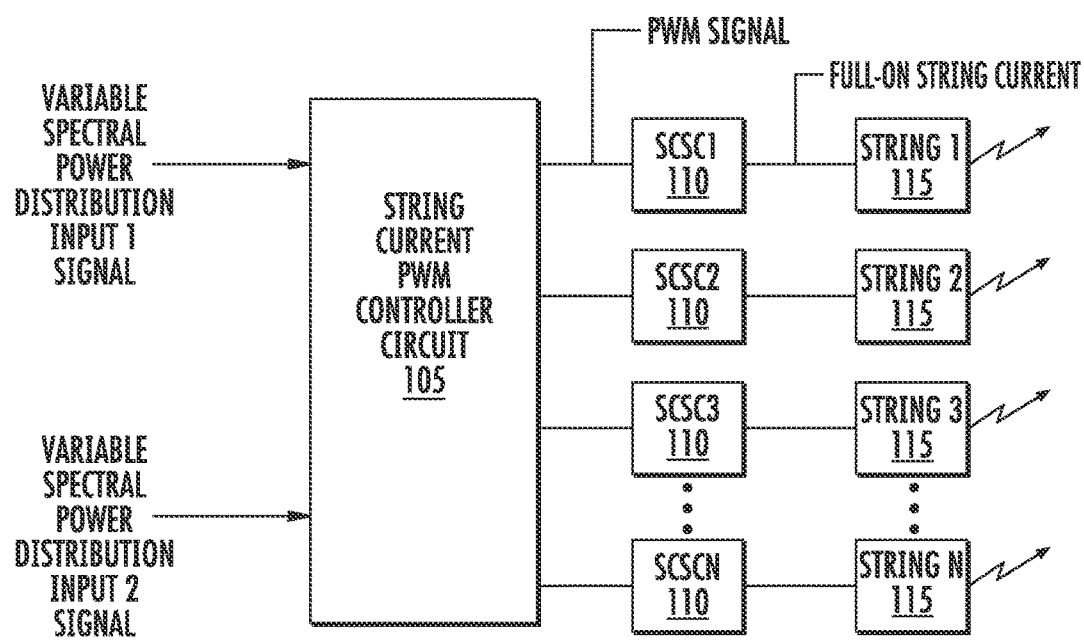
FIG. 4 is a block diagram illustrating a string current PWM controller circuit configured to enable full-on string current switching through a plurality of LED strings responsive to variable spectral power distribution input signals in some embodiments according to the invention.

FIG. 4 is a block diagram that illustrates a solid state lighting fixture 400 that is provided with a plurality of variable spectral power distribution input signals in some embodiments according to the invention. According to FIG. 4, the variable spectral power distribution input signals are provided to the string current PWM controller circuit 105 to specify targeted spectral power distribution values for light emitted by the fixture 400. The PWM signals generated by the string current PWM controller circuit 105 have duty cycles that are based on the targeted values selected by the respective variable spectral power distribution input signals.

As defined herein, the spectral power distribution input signal can indicate a level for any spectral power distribution of the light emitted by the fixture 400. In some embodiments, the spectral power distribution can include CCT, Color Quality Scale (CQS), dominant wavelength, GAI, peak wavelength, S/P ratio, brightness, luminous efficacy, and the like.

Accordingly, the PWM signals generated by the string current PWM controller circuit 105 can have variable duty cycles that are configured to provide light that is specified by the variable spectral power distribution input signals. Furthermore, the full-on string current associated with each of the LED strings 115 can be selected based on the maximum current needed to provide the full range of spectral power distribution light emitted by the fixture 400. For example, if the variable spectral power distribution input 1 specifies a variable level of CRI for light emitted by the fixture 400, a particular one of the strings 115 can be configured to vary the CRI of the light emitted by the fixture 400 responsive to PWM switching of an associated full-on current for that LED string. Furthermore, the full-on string current provided to the CRI LED string can be configured to be the maximum which may be needed to provide any CRI which may be specified by variable spectral power distribution input signal 1. Accordingly, in operation, the PWM signal to the CRI LED string has a duty cycle that is configured to provide the selected the CRI value for the fixture 400. As further shown in FIG. 4, it will be understood that multiple variable spectral power distribution input signals can be combined with one another by the string current PWM controller circuit 105 to provide the respective PWM signals so that the light fixture 400 may generate light having the targeted spectral power distribution specified by the inputs.

Figure 5:
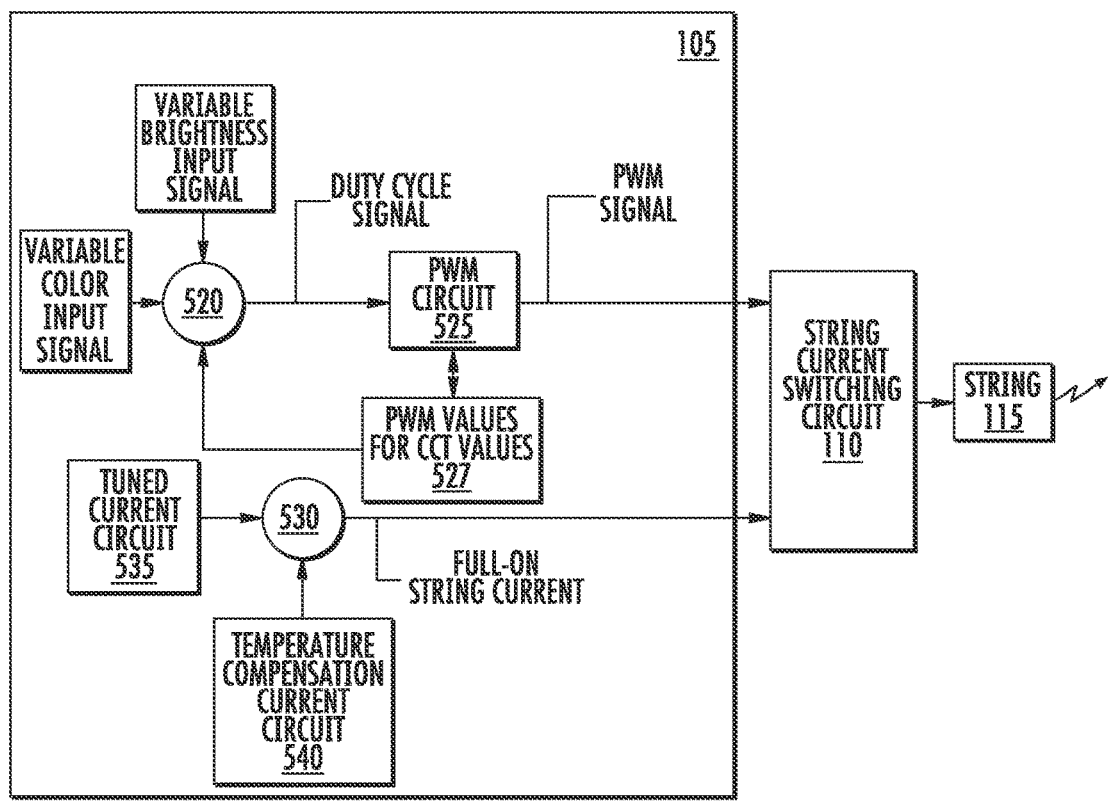
FIG. 5 is a block diagram illustrating a string current PWM controller circuit configured to generate a plurality of PWM signals for control of a plurality of string current switching circuits to enable/disable respective full-on string currents through each of the LED strings in some embodiments according to the invention.

FIG. 5 is a block diagram illustrating a portion of a solid state lighting apparatus 500 including a string current PWM controller circuit 105 that generates a PWM signal for control of a string current switching circuit 110 that enables/disables a full-on string current to the LED string 115 in response to the PWM signal in some embodiments according to the invention.

It will be understood that, for simplicity, the controller circuit 105 in FIG. 5 is shown coupled to only a single string current switching circuit 110 and respective LED string 115. It will be further understood, however, that the controller circuit 105 is configured for coupling to a plurality of string current switching circuits 110 and respective LED strings 115 as shown, for example, in FIGS. 3 and 4. The controller circuit 105 can, therefore, generate a plurality of PWM signals each being provided to a respective one of the string current switching circuits 110 and LED string 115.

According to FIG. 5, the controller circuit 105 can receive a variable color input signal that specifies a targeted value for the color to be emitted from the fixture 500. It will be understood that the variable color input signal can take any form of signal described herein including an analog signal level or a digital value. Furthermore, the variable color input signal can span a range of values which correspond to the range of targeted color values supported by the light fixture 500.

The controller circuit 105 also can receive a variable brightness input signal that can specify a targeted level of brightness of the light emitted by the fixture 500. It will be understood that the variable brightness input signal can be optional or can be set to a value which indicates full-on brightness such that the variable color input signal represents the only variable input to the controller circuit 105.

A combiner circuit 520 combines the variable color input signal level with the variable brightness input signal level to provide a duty cycle signal that is configured to indicate a variable time for which the full-on string current is to be provided through the LED string 115 so that the target combined color input signal and brightness input signal can affect the light emitted by the fixture 500. In some embodiments according to the invention, the combiner circuit 520 can be a multiplier that multiplies the level of the variable color input signal with the level of the variable brightness input signal to provide the duty cycle signal.

The duty cycle signal is provided to a PWM circuit 525 for generation of the PWM signal for the string current switching circuit 110. The PWM circuit 525 is configured to convert the duty cycle signal to a PWM signal that has the duty cycle including an on time and a complementary off time which is used to enable/disable the flow of full-on current through the LED string 115.

The PWM circuit 525 has access to PWM values for all of the CCT values 527 that are supported by the controller circuit 105. The value of the duty cycle signal can be used as an indication of the target CCT value for the fixture 500, which can be used to "look-up" for example, corresponding duty cycle values for each of the PWM signals. In operation, the PWM value for a particular LED string 115 that operates under the control of the PWM signal shown is utilized. In further embodiments according to the invention, it will be understood that the PWM values for CCT values 527 can be coupled to the combiner circuit 520 so that the duty cycle signal to the PWM circuit 525 indicates the duty cycle for the PWM signal so that the PWM circuit 525 may convert the duty cycle signal to a PWM signal having the associate duty cycle called for by a combination of the variable color input signal and the variable brightness input signal and the PWM values 527.

As further shown in FIG. 5, a tuned current circuit 535 can include an indication of the full-on string current specified, for example, during manufacturing, which indicates the maximum current needed to generate a lumen contribution by the particular LED string 115 as part of any CCT value supported by the fixture 500. In operation, the PWM signal can reduce the time when the full-on string current is allowed to pass through the LED string 115. Accordingly, control over the contribution of lumens from each of the LED strings 115 may be more easily controlled than if the current through the LED string were varied continuously to achieve the lumen contribution by the string, as appreciated by the present inventors.

Figure 8:
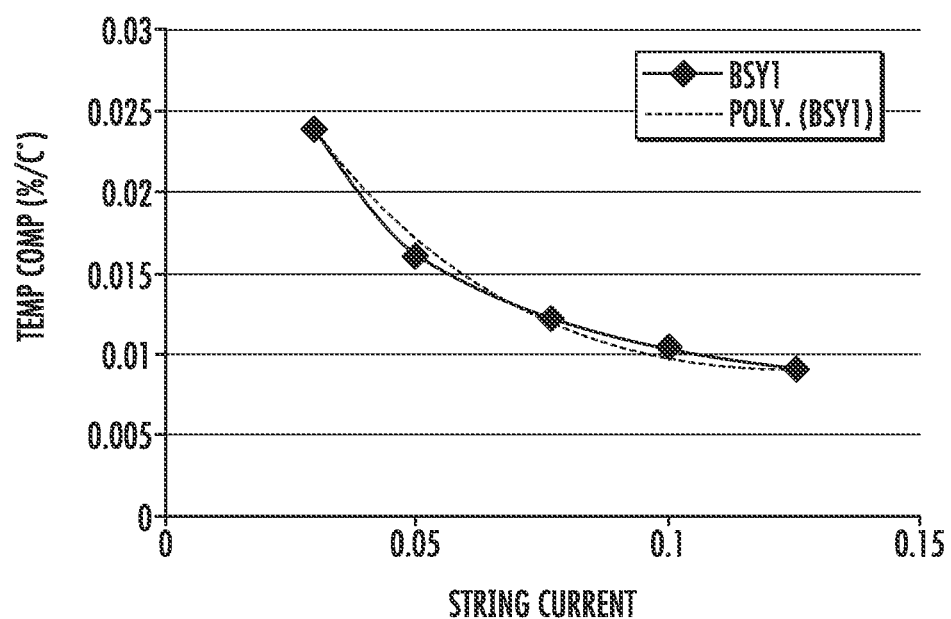
FIG. 8 is a graph that illustrates an exemplary temperature compensation relationship for the string current in some embodiments according to the invention.

As further shown in FIG. 5, a temperature compensation current circuit 540 can compensate for changes in temperature associated with the LED string 115 to compensate the full-on string current so that the color of the light emitted by the LEDs more closely tracks the specified CCT value as temperature varies. FIG. 8 shows temperature compensation as a function of string current which can be used to adjust the tuned current circuit 535 to generate the full-on string current. Temperature compensation is further described in, for example, U.S. patent application Ser. No. 14/292,286, filed May 30, 2014, which is commonly assigned to the current assignee, the entire contents of which are incorporated herein by reference.

As further shown in FIG. 5, a combiner circuit 530 can be used to combine the indication of the tuned current with the temperature compensation current called for by the currently indicated temperature associated with the LED string 115. In some embodiments according to the invention, the combiner circuit 530 can be a circuit which adds/subtracts an amount of temperature compensation current from the tuned current indication. For example, in some embodiments according to the invention, the tuned current indication can be increased or reduced based on an amount indicated by the temperature compensation curve shown in FIG. 8 to generate the full-on string current for the LED string 115 shown in FIG. 5.

As further shown in FIG. 5, the string current switching circuit 110 receives the PWM signal and the indication of the full-on string current and switches the full-on string current on/off through the LED string 115. In operation, the string current switching circuit 110 switches the full-on string current on/off through the LED string 115 in response to the PWM signal. Specifically, the string current switching circuit 110 may allow the full-on string current to flow through the LED string 115 when the PWM signal is high and block the full-on string current from flowing through the LED string 115 when the PWM signal is low.

It will be understood that the string current switching circuit 110 can be any circuit which is configured to enable/disable the full-on string current so as to pass through the LED string 115 in accordance with the operation of the PWM signal. For example, in some embodiments according to the invention, the string current switching circuit 110 can be a linear regulator circuit, a voltage controlled current source, a shunt circuit, or a switched converter circuit.

Figure 6:
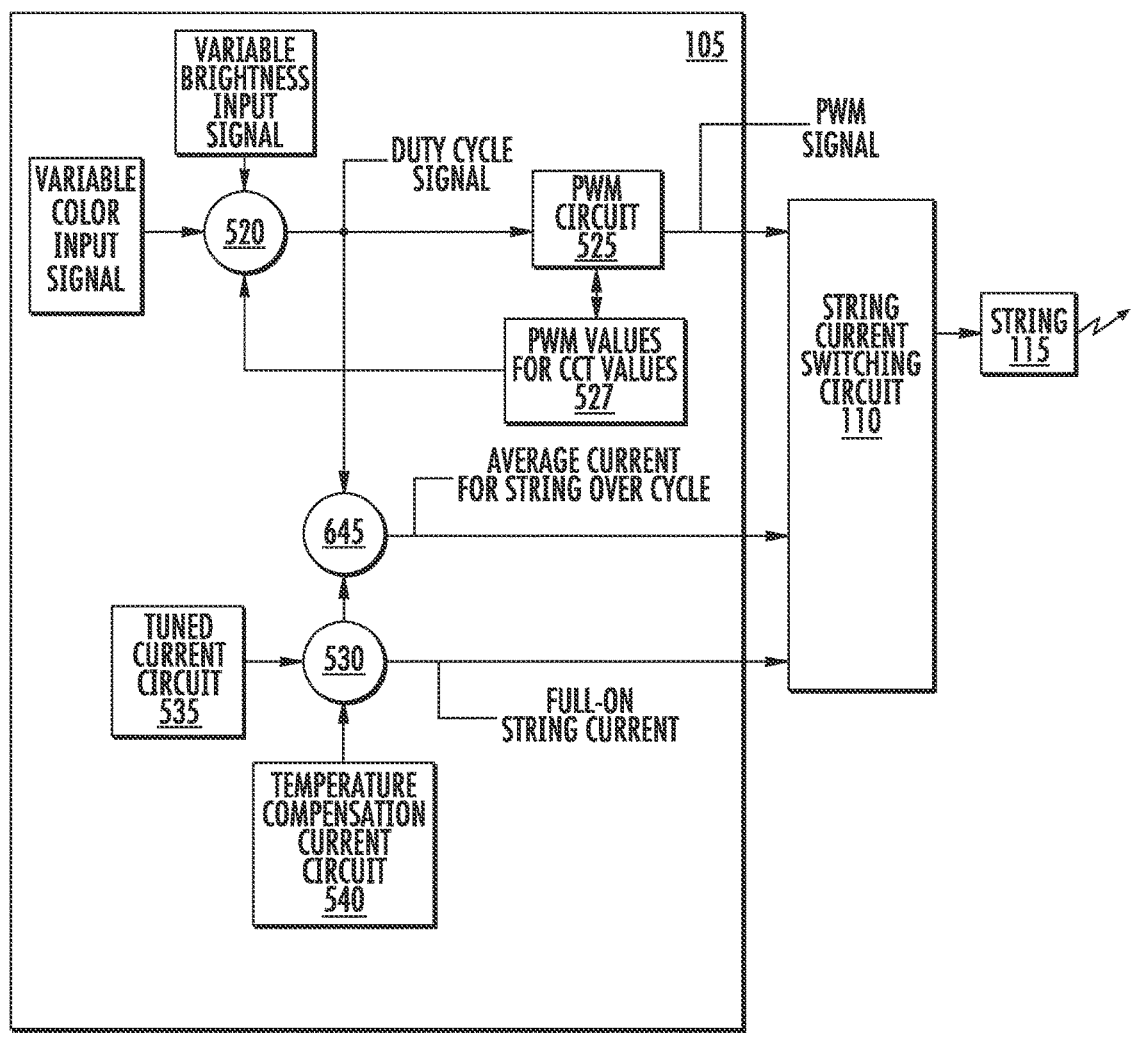
FIG. 6 is a block diagram illustrating a string current PWM controller circuit configured to generate a plurality of PWM signals, along with respective average string current indications, for a plurality of string current switching circuits to enable/disable the respective full-on string currents through each of the LED strings in some embodiments according to the invention.

FIG. 6 is a block diagram illustrating a portion of a solid state lighting apparatus 600 including a string current PWM controller circuit 105 coupled to a string circuit switching circuit 110 that is configured to enable/disable the full-on string current through the LED string 115 in some embodiments according to the invention. As shown in FIG. 6, the duty cycle signal generated by the combination of the variable brightness input signal and the variable color input signal can be provided to a combiner circuit 645 for combination with the indication of the full-on string current. The combination of the duty cycle signal and the full-on string current indication can be used to generate an indication of the average current which is to be used by the LED string over the cycle operation indicated by the PWM signal. It will be understood that the indication of the average current for the LED string over the cycle in which the PWM signal operates can be used to stabilize operation of the string current switching circuit 110 so as to more accurately maintain the lumen contribution by the LED string 115 in response to the PWM signal.

Figure 7:
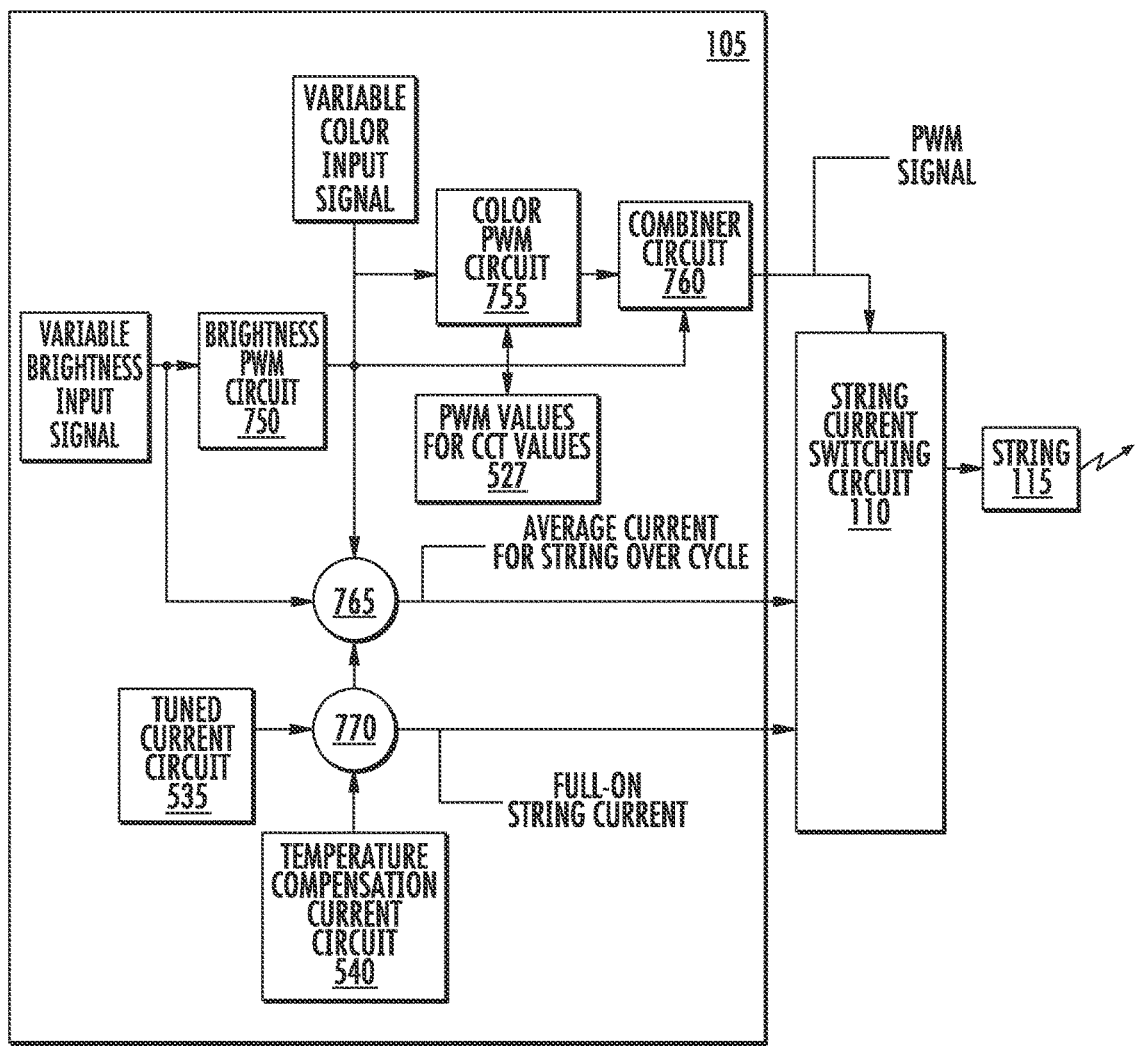
FIG. 7 is a block diagram illustrating a string current PWM controller circuit configured to generate a plurality of PWM signals through a combination of a brightness PWM signal and a color PWM signal to provide the plurality of PWM signals to the plurality of string current switching circuits to enable/disable the respective full-on string currents through each of the LED strings in some embodiments according to the invention.

FIG. 7 is a block diagram that illustrates a portion of a solid state lighting fixture 700 including a string current PWM controller circuit 105 coupled to a string current switching circuit 110 configured to enable/disable the full-on string current through the LED string 115 in response to operation of the PWM signal in some embodiments according to the invention. According to FIG. 7, the variable color input signal is provided to a color PWM circuit 755 for generation of a color PWM signal based thereon.

As further shown in FIG. 7, the variable brightness input signal is provided to a brightness PWM circuit 750 for generation of a brightness PWM signal which is combined within the color PWM signal by a combiner circuit 760 which generates the PWM signal for operation of the string current switching circuit 110. It will be understood that the combiner circuit 760 can be a logical "AND" circuit which combines the color PWM signal and the brightness PWM signal so that the PWM signal is on when both the color PWM signal and the brightness PWM signal are high and brings the PWM signal low when either the color PWM signal or the brightness PWM signal is low. It will be understood that the relative frequencies of the color and brightness PWM signals can be maintained in a relationship such that a frequency of one of the PWM signals is at least ten times greater than the frequency of the remaining PWM signal.

As further shown in FIG. 7, the variable color input signal and the variable brightness input signal can be provided to a combiner circuit 765 for generation of an indication of the average current for the LED string over the cycle of operation of the PWM signal. As described above in reference to FIG. 6, the indication of the average current for the LED string over the cycle of operation of the PWM signal can help maintain stability of the string current switching circuit 110 for more accurate generation of lumen output for the particular LED string 115.

Figure 9:
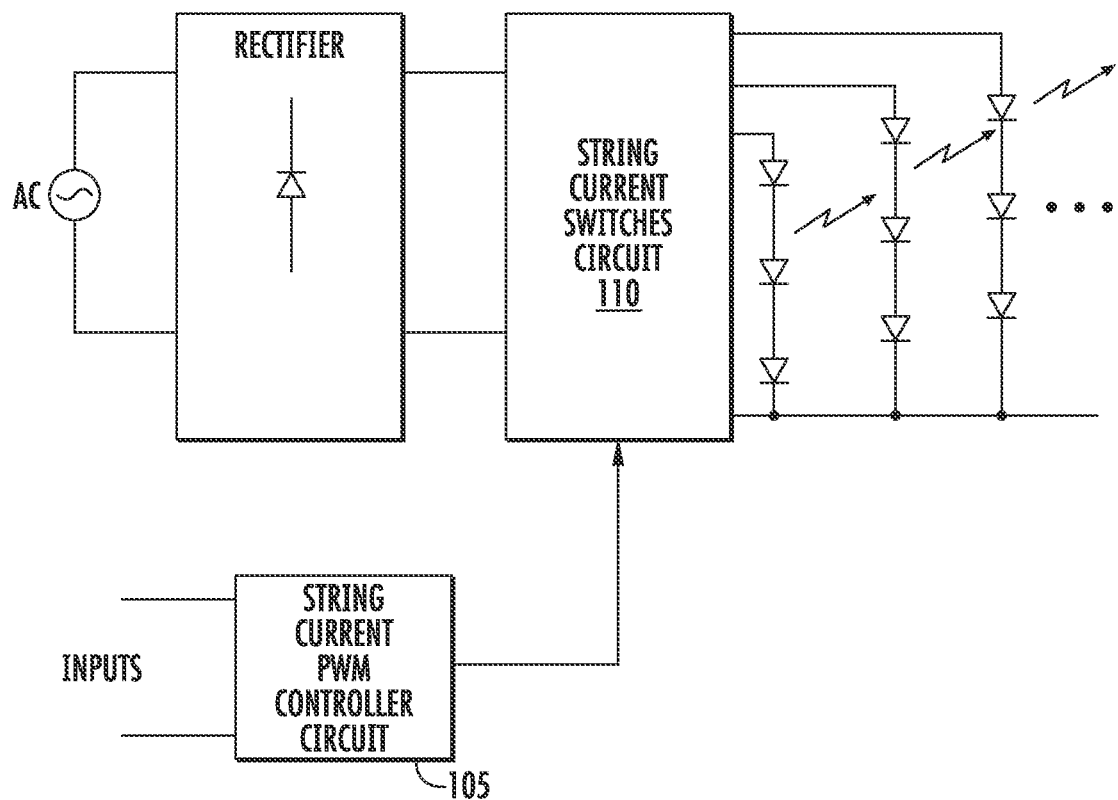
FIG. 9 is a schematic illustration of a lighting apparatus in some embodiments according to the invention.

FIG. 9 is a schematic illustration of a lighting apparatus in some embodiments according to the invention. According to FIG. 9, a rectifier circuit is configured for coupling to an AC voltage source to provide a rectified voltage as a power supply for the string current switching circuit 110. The string current switching circuit 110 is coupled to a plurality of LED strings, each or which can be provided by a particular current that can be switched on/off through the respective LED string. The string current switching circuit 110 operates responsive to PWM control signals generated by the string current PWM controller circuit 105 based on the inputs provided.

It will be understood that although FIG. 9 schematically illustrates a plurality of single LED strings, any configuration of LEDs can be used. For example, multiple strings can be coupled in parallel and operate as one string under control of the string current switching circuit 110. In some embodiments according to the invention, the LED strings can include more or fewer LEDs and different strings may include LEDs of different color, where each the LED strings may be characterized as having an average color or lumen output based on the individual LEDs in that string. In some embodiments according to the invention, the LED strings can include a parallel arrangement of LEDs, such as to LEDs in parallel in the string. In still other embodiments according to the invention, a combination of additional LEDs in series as well as additional LEDs in parallel with one another in the string can also be used. Other arrangements may also be used.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

It will be understood that, as used herein, the term light emitting diode may include a light emitting diode, laser diode and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive layers.

In the embodiments of the present disclosure, aspects may be illustrated and described in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to block diagrams of methods, apparatus (systems), and computer program products according to embodiments of the disclosure. It will be understood that each block of the block diagrams, and combinations of block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the block diagram block or blocks.

The block diagrams in the figures illustrate the architecture, functionality, and operation of possible implementations of systems, methods, and computer program products according to various aspects of the present disclosure. In this regard, each block represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

What is claimed:

1. A solid state lighting apparatus comprising:
   a variable color input signal configured to change a target color of light output from the apparatus; and
   a string current Pulse Width Modulation (PWM) controller circuit coupled to the variable color input signal, the string current PWM controller circuit configured to generate a plurality of PWM signals having respective variable duty cycles to enable/disable respective particular string currents for respective variable times to change the light output from the apparatus as the variable color input signal changes,
   wherein the particular string currents comprise respective full-on string currents, and
   wherein at least two of the respective full-on string currents are different from one another.

2. The apparatus of claim 1 further comprising:
   a plurality of solid state Light Emitting Device (LED) strings, each of the LED strings configured to conduct one of the respective full-on string currents; and
   a plurality of string current switching circuits, each configured to receive a respective one of the PWM signals to enable/disable one of the respective full-on string currents to flow through a respective one of the LED strings using the respective variable duty cycle.

3. The apparatus of claim 2 wherein the string current PWM controller circuit includes a plurality of PWM circuits configured to generate the plurality of PWM signals based on a level of the variable color input signal.

4. The apparatus of claim 3 wherein each of the PWM circuits has access to a PWM duty cycle value for the respective one of the LED strings at the level of the variable color input signal.

5. The apparatus of claim 3 further comprising:
   a variable brightness input signal configured to indicate a target brightness level of the light output from the apparatus, wherein the string current PWM controller circuit is configured to combine the level of the variable color input signal with a level of the variable brightness input signal to provide the plurality of PWM signals.

6. The apparatus of claim 5 wherein the string current PWM controller circuit is configured to multiply the level of the variable color input signal with the level of the variable brightness input signal to provide a combined color/brightness input signal.

7. The apparatus of claim 6 wherein each of the PWM circuits has access to a PWM duty cycle value for the respective one of the LED strings at a level of the combined color/brightness input signal.

8. The apparatus of claim 2 wherein the string current PWM controller circuit includes a plurality of tuned current indications, each corresponding to a predetermined color value for one of the LED strings.

9. The apparatus of claim 8 wherein the string current PWM controller circuit includes a plurality of temperature compensation current indications, each corresponding to a predetermined current adjustment for the respective one of the LED strings based on a temperature of that LED string.

10. The apparatus of claim 9 wherein each of the tuned current indications is combined with a respective one of the temperature compensation current indications to provide an indication of the respective full-on string current.

11. The apparatus of claim 10 wherein the string current PWM controller circuit is configured to multiply a level of the variable color input signal with a level of a variable brightness input signal to provide a combined color/brightness input signal, the string current PWM controller circuit further including:
a plurality of average string current circuits, each configured to combine the respective indication of the full-on string current with a level of the combined color/brightness input signal to provide a respective average string current for each of the LED strings.

12. The apparatus of claim 5 wherein the string current PWM controller circuit further includes:
a plurality of brightness PWM circuits, each configured to generate a brightness PWM signal for the respective one of the LED strings based on the level of the variable brightness input signal;
a plurality of color PWM circuits, each configured to generate a color PWM signal for the respective one of the LED strings based on the level of the variable color input signal; and
a plurality of PWM combination circuits, each configured to combine a respective color PWM signal with a respective brightness PWM signal to provide one of the plurality of PWM signals.

13. The apparatus of claim 2 wherein the plurality of string current switching circuits each comprises a linear regulator circuit, a voltage controlled current source, a shunt circuit, or a switched converter circuit.

14. The apparatus of claim 12 wherein a frequency of the color PWM signals is at least 10 times greater than a frequency of the brightness PWM signals or wherein the frequency of the brightness PWM signals is at least 10 times greater than the frequency of the color PWM signals.

15. The apparatus of claim 1 wherein the variable color input signal is configured for manual input to change the target color of the light output from the apparatus.

16. A solid state lighting apparatus comprising:
a plurality of solid state Light Emitting Device (LED) strings, each of the LED strings configured to conduct a respective one of a plurality of particular string currents;
a variable color input signal configured to indicate a target color of light output from the apparatus;
a variable brightness input signal configured to indicate a target brightness level of the light output from the apparatus;
a string current Pulse Width Modulation (PWM) controller circuit including:
a color/brightness combiner circuit configured to multiply a level of the variable color input signal with a level of the variable brightness input signal to provide a combined color/brightness input signal; and
a plurality of PWM circuits configured to generate a plurality of PWM signals at respective variable duty cycles to enable/disable the respective particular string current for a respective variable time based on a level of the combined color/brightness input signal; and
a plurality of string current switching circuits, each configured to receive a respective one of the plurality of PWM signals and configured to enable/disable the respective particular string current to flow through a respective one of the LED strings using the respective variable duty cycle.

17. The apparatus of claim 16 wherein the respective particular string current comprises a respective full-on string current, wherein each of the PWM circuits has access to a PWM duty cycle value for the respective one of the LED strings at a level of the combined color/brightness input signal.

18. The apparatus of claim 17 wherein the string current PWM controller circuit includes a plurality of tuned current indications, each corresponding to a predetermined color value for one of the LED strings.

19. The apparatus of claim 18 wherein the string current PWM controller circuit includes a plurality of temperature compensation current indications, each corresponding to a predetermined current adjustment for the respective one of the LED strings based on a temperature of that LED string.

20. A solid state lighting apparatus comprising:
a plurality of solid state Light Emitting Device (LED) strings, each of the LED strings configured to conduct a respective one of a plurality of particular string currents;
a first variable spectral power distribution input signal configured to change a first target spectral characteristic of light output from the apparatus;
a second variable spectral power distribution input signal configured to change a second target spectral characteristic of the light output from the apparatus; and
a string current Pulse Width Modulation (PWM) controller circuit coupled to the first and second variable spectral power distribution input signals, the string current PWM controller circuit configured to combine respective levels of the first and second variable spectral power distribution input signals to provide a combined variable spectral power distribution input signal, and configured to generate a plurality of PWM signals having respective variable duty cycles to enable/disable respective particular string currents for respective variable times to change the light output from the apparatus as a level of the combined variable spectral power distribution input signal changes,
wherein the particular string currents comprise respective full-on string currents, and
wherein at least two of the respective full-on string currents are different from one another.

21. The apparatus of claim 20 wherein the first and second variable spectral power distribution input signals respectively comprise:
a variable color input signal configured to indicate a target color of light output from the apparatus; and
a variable input indicating a target value for the light emitted by the apparatus including a Color Quality Scale (CQS), a dominant wavelength, a Gamut Area Index (GAI), a peak wavelength, a scotopic luminance (or lumens) versus photopic luminance (S/P) ratio, a luminous efficacy, and/or a CRI value.

* * * * *